INVENTOR.
Russell E. Fredrick
Robert W. Fritts
Clarence R. Manser
BY Seeger & Schwalbach
Att'ys United States Patent Office 2,956,023

Patented Oct. 11, 1960

2,956,023

SEMICONDUCTOR ELEMENTS

Russell E. Fredrick, Milwaukee, Robert W. Fritts, Elm Grove, and Clarence R. Manser, Appleton, Wis., assignors, by mesne assignments, to Minnesota Mining and Manufacturing Company, St. Paul, Minn., a corporation of Delaware Filed Dec. 19, 1956, Ser. No. 629,366

6 Claims. (Cl. 252—62.3)

This invention relates to non-stoichiometric binary intrinsic semiconductor elements for particularly composed of indium and tellurium and to electrical devices comprising such elements.

An object of this invention is to provide electrical elements comprising a non-stoichiometric binary intrinsic semiconductor crystal.

Another object is to provide electrical elements of the aforedescribed character having purely intrinsic semi-conductivity in which such intrinsic semi-conductivity is not destroyed by the presence of small amounts of other matter, such as matter often found in the crystal constituents as trace impurities.

Another object is to provide electrical elements of the aforedescribed character comprising a non-stoichiometric intrinsic semiconductor consisting essentially of indium and tellurium.

Another object of this invention is to provide electrical elements exhibiting extremely high electrical resistivity and large negative temperature coefficients of electrical resistivity having utility, for example, as "thermistor" elements.

Another object is to provide electrical elements of the aforedescribed character affording greater change of resistivity with temperature change and hence greater sensitivity than elements of this character previously known to the art.

Another object of the invention is to provide elements composed of indium and tellurium having the aforementioned electrical characteristics in which such electrical characteristics are reproducible and stable.

Another object is to provide a method of fabricating elements of indium and tellurium having the aforementioned electrical characteristics to afford reproducibility and chemical stability.

Figure 1:
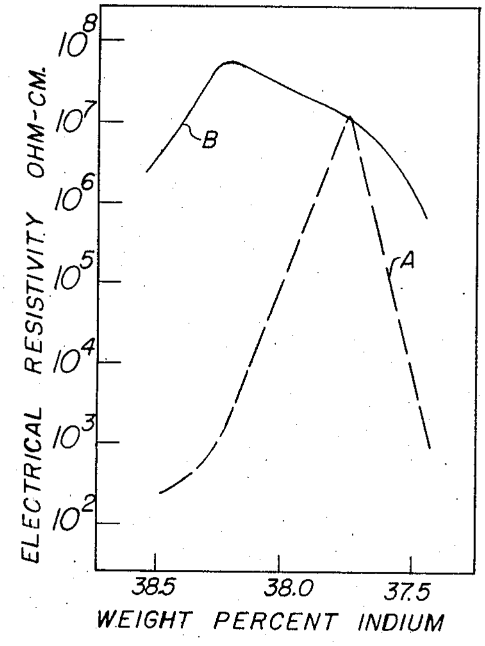
Figure 2:
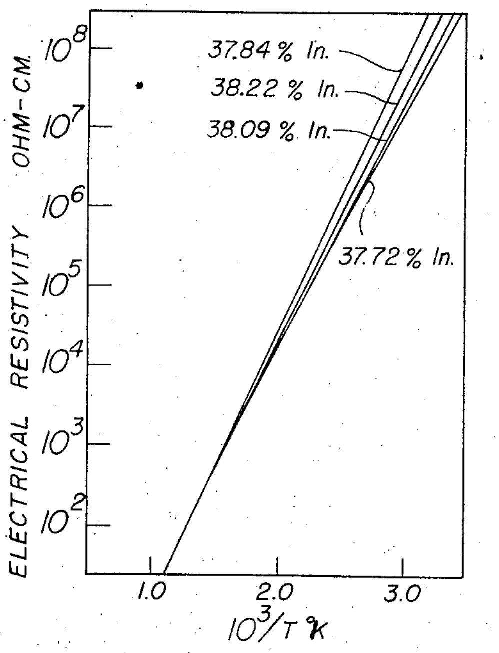

These objects of the invention and others will become apparent from the following description taken in connection with the drawings in which:

Figure 1 is a graphic representation of electrical resistivity at room temperature of the elements composed of indium and tellurium which are the subject of this invention; and Figure 2 is a graphic representation of the temperature dependence of the electrical resistivity of elements embodying the invention composed of indium and tellurium within the range of such indium-tellurium compositions as are the subject of this invention.

The electrical elements of the present invention are characterized as non-stoichiometric crystals of two constituents having purely intrinsic semi-conductivity. As is well known in the art binary semiconductors are generally pure, stoichiometric compounds if they are to have purely intrinsic semi-conductivity, or when non-stoichiometric as, for example, by addition of "impurities" or "doping agents" become extrinsic semi-conductors. In contradistinction the electrical elements of the present invention not only exhibit purely intrinsic semi-conductivity despite their non-stoichiometric character, but exhibit no conductivity due to impurities (extrinsic conductivity) even if impurities or doping agents are purposely added.

The various indium-tellurium elements embodying the invention disclosed herein ranging from 37.60% to 38.50% by weight indium, balance substantially all tellurium are all non-stoichiometric intrinsic semiconductors as aforedescribed as is evidenced by the linearity of the curves of Figure 2, wherein the log of the electrical resistivity expressed in ohm-cm. is plotted for convenience against the reciprocal of absolute (Kelvin) temperature, or as may be symbolically expressed $10^3/T°$ K. Elements of indium and tellurium falling to either side of the aforementioned range begin to exhibit additional conductivity due to the presence of short circuiting phases and comparable curves therefor depart from the linearity aforementioned. This can also be evidenced by metallographic examination, as will hereinafter be described. For these reasons the aforementioned range is to be considered critical.

The indium-tellurium elements embodying the present invention are characterized by exhibiting extremely high electrical resistivity, in excess of one million ohms-cm. at room temperature, as is illustrated graphically in Figure 1. Moreover, they exhibit large negative temperature coefficients of resistivity affording great sensitivity in change of electrical resistivity with temperature, which is well illustrated by the steep linear slope of the curves of Figure 2 aforementioned wherein the various curves are for elements having the amount of indium indicated, the balance in each case being substantially all tellurium.

One method of evaluating elements of this type is to determine the temperature coefficient of electrical resistance. For the indium-tellurium elements embodying this invention this coefficient is approximately $-8\%/°$ C. at room temperature, whereas electrical devices of this character at present commercially available, generally comprising oxide complexes or the like, have a value for this coefficient of $-4.5\%°$ C. In this respect, therefore, the sensitivity of the electrical elements of this invention is about twice that of elements now known in the art. At lower temperatures this coefficient is even greater and rises to a value of $-14.3\%°$ C. at $-50°$ C. while when the temperature is raised above room temperature this coefficient decreases to $-2.1\%$ at 300° C.

The indium-tellurium elements embodying the present invention exhibiting the aforeindicated electrical characteristics lie as aforementioned within the range of from 37.60% to 38.50% by weight indium, balance substantially all tellurium. As shown in Figure 1, which is a graphic representation of electrical resistivity measured at room temperature expressed in ohm-cm. on a log scale shown as a function of the relative concentrations of indium and tellurium, the resistivity of elements outside the aforementioned range drops rapidly.

The electrical elements aforedescribed of indium and tellurium embodying the invention are complex crystal forms not identifiable as the simple stoichiometric compounds given in the published phase diagrams of the system In-Te. The crystalline species yielding the desired high resistivity can be prepared by a simple two-step process as follows:

(1) Indium and tellurium metal in the aforementioned range of proportions is melted together in a suitable mold with agitation to insure adequate mixing and is caused to solidify rapidly enough to avoid widespread segregation of low melting point components.

(2) The cast ingot is subsequently annealed at an elevated temperature to develop the high resistivity crystalline phases and remove any highly conductive phases.

The material produced by this two-step process is best described as a polycrystalline aggregate of small grains in which the crystal form of the grains depends upon the proportions of indium and tellurium. The actual structure of the grains exhibiting the high resistivity is uncertain; however, it is believed to be a form of mixed crystal in which the tellurium is bound to indium through a combination of both divalent and trivalent indium linkages, which accounts for the non-stoichiometric composition. It is likely that this structure is of the spinel type.

When an element containing 37.6% indium, balance substantially all tellurium, is cast as in Step 1 above and examined metallographically, two phases are observed. Grains having an approximate composition of 37.7% in balance Te can be seen separated at their boundaries by a very minute phase rich in tellurium. Upon annealing as in Step 2, the minor Te rich phase may be altered in its distribution, resulting in the resistivity increase shown by the difference in curves A and B of Figure 1. In elements containing less indium than 37.6%, the second Te rich phase is sufficiently extensive to cause significant short circuiting of the grains and this destroys the linearity of the resistivity-temperature plot.

When elements in the range of 37.6% to 37.8% indium, balance substantially all Te are cast, no short circuiting phase is observed. When elements containing from 37.8% to 38.5% In balance Te are cast, three phases may be observed metallographically with the aid of a thermal etch. The predominant phase at the 37.8% In composition appears to be grains containing 37.7% In. Additionally, evidence of the highly conductive InTe phase can be found and a third phase, which seems to be the reaction product of InTe and the 37.7% In grains, develops as the elements are annealed. As the indium concentration is increased from 37.8% to 38.5%, more and more of the InTe phase appears in the ingot as cast and this accounts for the drastic reduction in resistivity for the left hand portion of curve A in Figure 1. This InTe, however, is effectively removed in the annealing Step 2, by reaction with the 37.7% In grains present in the as cast sample to form new grains containing approximately 38.2% In. When an element of 38.2% In is cast and annealed, the InTe reaction with the 37.7% In grains converts the entire crystal to grains of 38.2% In. As a result of annealing, the In-Te elements in the range from 37.8% to 38.5% appear to be converted into a fine grained mixture of two phases of slightly different composition (i.e., 37.7% In and 38.2% In, balance tellurium). These two species are then the complex mixed crystals which either singly or in combination impart the high resistivity to the range of compositions claimed. The relative concentrations of these two phases depends upon the proportions of In and Te within the range claimed.

Our discovery that the range of annealed compositions giving linear resistivity-temperature curves, i.e., from 37.6% to 38.5% In balance substantially all Te, extends beyond the presumed range in grain composition, 37.7% and 38.2% In, shows to what extent the crystalline aggregate can accommodate composition deviation without significant short circuiting. Elements having more than 38.5% indium and more than 62.4% tellurium, even when annealed, suffer too much internal short circuiting to yield elements having the desired electrical characteristics. For this additional reason the ranges of proportions of In and Te stated are deemed to be critical.

The indium-tellurium elements aforedescribed and electrical devices composed thereof may contain residual impurities of the order of 0.1% by weight without deleterious effect upon the electrical properties of the element. Indium may be obtained commercially with a purity of 99.95% or better, which is adequate for purposes of this invention. On the other hand, some grades of commercial tellurium may contain large amounts of metal such as copper and bismuth. When this is the case, the tellurium should be purified to the extent aforeindicated.

The aforedescribed elements are formed by direct synthesis of the two constituents. The indium and tellurium are melted together in the desired proportions within the stated range, i.e., 37.60% to 38.50% by weight indium, balance substantially all tellurium and agitated under an atmosphere of hydrogen. The reacted material is then cast into desired shapes, preferably in carbon molds, under hydrogen. After casting into ingot form the ingots are then annealed under hydrogen at about 550° C. for about 15 hours, it being understood that annealing at a lower temperature for a longer period of time is permissible. This annealing affects the room temperature resistivity of compounds within the stated range as shown in Figure 1, wherein curve A plots such resistivity of the ingots as cast and curve B plots such resistivity of the ingots after the aforedescribed hydrogen annealing step. Such annealing also affords excellent reproducibility of the desired electrical properties.

Fabrication of the aforedescribed ingots of the composition stated proceeds with provision of electrical contacts made to the ingot by soft soldering techniques well known in the art. The element is then preferably coated with a resin or varnish having high electrical resistivity. This coating will prevent surface oxidation of the indium-tellurium elements, which because of the very high resistivity of the element would produce a surface conductive layer that could short circuit the element. In this connection, it should be noted that where the element is formed of oxidized constituents it may be necessary to grind away a thin scum that forms on the external surface. Where this is necessary, the element should be coated immediately after grinding to restrict surface oxidation for the reasons aforementioned.

We claim:

1. A semiconductor crystal of indium and tellurium consisting essentially of from 37.60% to 38.50% by weight indium, the balance substantially all tellurium and containing less than 0.1% residual impurity.

2. A thermistor comprising an indium-tellurium element consisting essentially of from 37.60% to 38.50% by weight indium, the balance substantially all tellurium.

3. An electrical element comprising the reaction product of indium and tellurium in the proportions of from 37.60% to 38.50% by weight indium, the balance substantially all tellurium annealed at about 550° C. for about 15 hours.

4. The method which comprises reacting indium and tellurium in the proportions of from 37.60% to 38.50% by weight indium, the balance substantially all tellurium, and annealing the reaction product for about 15 hours at a temperature of about 550° C.

5. A composition consisting essentially of indium and tellurium in the range of from 37.60% to 38.50% by weight indium, the balance substantially all tellurium.

6. A composition consisting essentially of indium and tellurium in the range of from 37.60% to 38.50% by weight indium, the balance substantially all tellurium, and containing no more than 0.1% by weight of other matter.

References Cited in the file of this patent

UNITED STATES PATENTS

| | | |
|---|---|---|
| 2,788,382 | Faus | Apr. 9, 1957 |
| 2,809,165 | Jenny | Oct. 8, 1957 |

OTHER REFERENCES

Physica, vol. XX, No. 11, November 1954, pp. 1110, 1111, November 1954 Amsterdam Conference—Semi-Conductors.